United States Patent
Stoenescu et al.

(10) Patent No.: US 10,119,309 B2
(45) Date of Patent: Nov. 6, 2018

(54) KEY-OPERATED UNLOCKING OF AUTOMOTIVE POWER-OPERATED KEY-CYLINDER-LESS DOOR LOCKS

(71) Applicant: FCA Italy S.p.A., Turin (IT)

(72) Inventors: Bogdan Stoenescu, Turin (IT); Luigi Laera, Turin (IT); Gianfranco Del Nero, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/581,579

(22) Filed: Apr. 28, 2017

(65) Prior Publication Data

US 2017/0314301 A1     Nov. 2, 2017

(30) Foreign Application Priority Data

Apr. 29, 2016  (EP) ..................................... 16167828

(51) Int. Cl.
*E05B 81/64*     (2014.01)
*E05B 81/00*     (2014.01)
(Continued)

(52) U.S. Cl.
CPC .............. *E05B 81/64* (2013.01); *B60R 25/24* (2013.01); *E05B 81/00* (2013.01); *E05B 83/16* (2013.01);
(Continued)

(58) Field of Classification Search
CPC ......... B60R 11/06; B60R 25/00; B60R 25/24; E05B 47/0607; E05B 77/00; E05B 77/48; E05B 81/00; E05B 81/06; E05B 81/14; E05B 81/64; E05B 81/90; E05B 83/16; E05B 85/06; E05B 85/18; G07C 9/00; G07C 9/00182; G07C 2009/0019; Y10T 70/5978
(Continued)

(56) References Cited

U.S. PATENT DOCUMENTS

| 6,050,117 A * | 4/2000 | Weyerstall | E05B 77/12 292/201 |
| 2001/0022549 A1* | 9/2001 | Mauel | E05B 77/26 340/5.72 |

(Continued)

FOREIGN PATENT DOCUMENTS

| DE | 19545722 A1 | 4/1997 |
| DE | 10022894 A1 | 11/2001 |
| EP | 1467322 A2 | 10/2004 |

OTHER PUBLICATIONS

EP16167828.9: Search Report dated Nov. 7, 2016 (7 pages).

*Primary Examiner* — Quan-Zhen Wang
*Assistant Examiner* — Stephen Burgdorf
(74) *Attorney, Agent, or Firm* — Greer, Burns & Crain, Ltd.

(57) ABSTRACT

A motor vehicle comprising side doors, a bonnet and a boot lid, power-operated key-cylinder-less locks associated with all the side doors, a power-operated lock associated with the boot lid, a key-cylinder lock associated with the bonnet, and an electronic control system configured to sense operation of the key-cylinder lock by means of a mechanical key and, upon determining a specific operation of the key-cylinder lock by means of a mechanical key, responsively unlock one or more of the power-operated key-cylinder-less locks.

3 Claims, 1 Drawing Sheet

(51) Int. Cl.
*E05B 83/16* (2014.01)
*E05B 85/06* (2014.01)
*G07C 9/00* (2006.01)
*B60R 25/24* (2013.01)

(52) U.S. Cl.
CPC .......... *E05B 85/06* (2013.01); *G07C 9/00182* (2013.01); *G07C 2009/0019* (2013.01)

(58) Field of Classification Search
USPC ....................................................... 340/5.72
See application file for complete search history.

(56) References Cited

U.S. PATENT DOCUMENTS

| | | | |
|---|---|---|---|
| 2003/0029210 A1* | 2/2003 | Budzynski | E05B 85/10 70/278.1 |
| 2008/0105012 A1* | 5/2008 | Poppell | B60R 11/06 70/279.1 |
| 2013/0237193 A1* | 9/2013 | Dumas | G07C 9/00571 455/414.1 |
| 2017/0101076 A1* | 4/2017 | Krishnan | G07C 9/00817 |

* cited by examiner

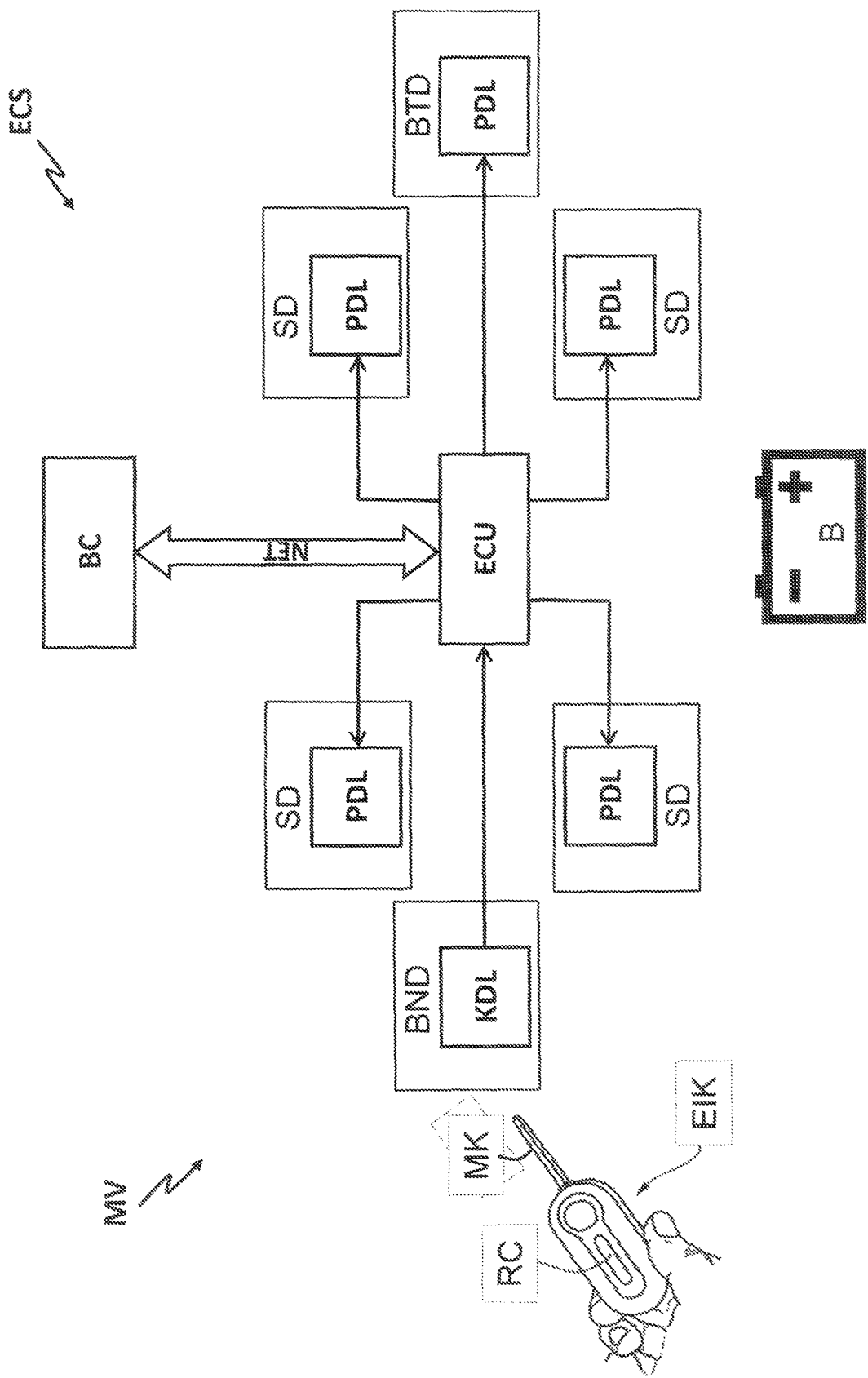

KEY-OPERATED UNLOCKING OF AUTOMOTIVE POWER-OPERATED KEY-CYLINDER-LESS DOOR LOCKS

RELATED APPLICATIONS

This application claims priority to European Patent Application No. 16167828.9 filed on Apr. 29, 2016, which is incorporated herein by reference in its entirety.

FIELD OF THE DISCLOSURE

The present invention relates to key-operated unlocking of automotive power-operated key-cylinder-less door locks.

BACKGROUND

As is known, in the automotive industry cost reduction has always been one of the key elements for the growth, development and competitiveness of those operating in this field.

Among the costs that have always been attempted to contain are those, which are anything but negligible, that are ascribable to the manufacture of right-hand drive motor vehicles and left-hand drive motor vehicles.

The object of the present invention is therefore to provide a solution that enables costs ascribable to this differentiation to be contained.

According to the present invention, a motor vehicle is therefore provided, as defined in the appended claims.

BRIEF DESCRIPTION OF THE DRAWINGS

The accompanying FIGURE shows a block diagram of an automotive electronic control system configured to implement the present invention.

DETAILED DESCRIPTION

The present invention is described in detail with reference to the accompanying drawing to enable those skilled in the art to embody and use it. The generic principles described herein can be applied to other embodiments and applications without departing from the scope of the present invention, as defined in the appended claims. Thus, the present invention is intended not to be limited to the described embodiments, but is to be accorded the widest scope consistent with the principles and features described and claimed herein.

The present invention arises from the observation of how one of the many solutions adopted in the automotive field for the reduction of costs and pertaining to bonnet (hood) opening also contributes to reducing elements of differentiation between right-hand drive motor vehicles and left-hand drive motor vehicles, with a consequent reduction in the costs ascribable thereto.

In particular, in the majority of motor vehicles, the bonnet lock is of a key-cylinder-less type and is unlocked from the passenger compartment via an unlocking mechanism comprising a lever arranged in the passenger compartment, close to the driver's seat, and a linkage, generally comprising a Bowden cable, to unlock the bonnet lock in response to a lever operation. For safety reasons, unlocking of the bonnet lock fails to result in the bonnet being opened, but only in a partial raising of the bonnet to provide external access to a further lever that must be manually operated for the complete opening of the bonnet.

The arrangement of the bonnet unlocking lever and the consequent arrangement of the associated linkage result in this unlocking mechanism being necessarily different in right-hand drive motor vehicles with respect to left-hand drive motor vehicles, thereby representing one of the costs ascribable to this differentiation.

Motor vehicles of some manufacturers fail to have this unlocking mechanism and are instead provided with a purely mechanical, i.e., non-power-operated, key-cylinder bonnet lock, so as to allow the bonnet to be opened with a mechanical key, typically represented by the motor vehicle's ignition key. In particular, in these motor vehicles, the rotation of the mechanical key in one direction, for example anticlockwise, causes the bonnet lock to unlock, with consequent partial raising of the bonnet, while rotation of the mechanical key in the other direction, clockwise in the example considered, causes the bonnet to open completely, i.e. the function that, in those systems where the unlocking is operated from the passenger compartment via a dedicated unlocking lever, is performed manually by operating the lever that becomes accessible from the outside after the bonnet is partially raised.

Omission of the unlocking mechanism of the bonnet lock thus represents a solution that could contribute to reducing the elements of differentiation between right-hand drive motor vehicles and left-hand drive motor vehicles, with consequent benefits in terms of costs ascribable to this differentiation.

The present invention specifically exploits the presence of these key-cylinder bonnet locks to further reduce the costs ascribable to the differentiation between right-hand drive motor vehicles and left-hand drive motor vehicles.

Basically, the present invention provides for equipping the motor vehicle side doors and, where not already and where there is interest in doing so, also the boot (trunk) lid (and optionally the fuel tank filler hatch), with power-operated key-cylinder-less locks and then implementing the manual unlocking of one or more of these power-operated key-cylinder-less locks in a programmable manner, depending on which of these locks it is wished to unlock, in response to a specific operation of the bonnet lock by means of a mechanical key and exploiting the remotely controllable central locking system.

Manual unlocking of the power-operated key-cylinder-less locks can be implemented in response to the same operation of the bonnet lock cylinder by means of the mechanical key as that performed to open the bonnet, or, expediently, in response to a different operation of the bonnet lock cylinder by means of the mechanical key from that performed to open the bonnet.

In an embodiment, cylinder rotation in a given direction, for example clockwise, causes both the bonnet lock and those power-operated locks for which the key-operated central unlocking function has been programmed to unlock.

In a different embodiment, cylinder rotation in a first direction, for example clockwise, causes the bonnet lock to unlock, and possibly also to open, while cylinder rotation in a second direction, opposite to the first direction, anticlockwise in the example considered, causes those power-operated locks for which the key-operated central unlocking function has been programmed to unlock.

The bonnet lock cylinder rotation direction can be sensed by means of electronic and/or mechanical sensors.

Furthermore, although the key-cylinder bonnet lock in motor vehicles currently on the market is a non-power-operated lock, this is not an essential feature for the purposes of reducing the present invention to practice, and so if conditions so permit, nothing prevents the bonnet lock from being also a power-operated lock.

The accompanying FIGURE shows a non-limitative example of a block diagram of an electronic control system ECS to control power-operated locks PDL in a motor vehicle MV according to present invention.

In particular, the accompanying FIGURE shows a motor vehicle MV equipped with four side doors (two front doors and two rear doors, left and right, respectively), referenced by SD, a bonnet, referenced by BND, and a boot lid, referenced by BTD, and wherein all of the side doors SD, as well as the boot lid BTD, are fitted with power-operated key-cylinder-less locks PDL, while the bonnet BND is fitted with a non-power-operated key-cylinder lock KDL.

The electronic control system ECS, only those parts of which that are pertinent to the reduction of the present invention to practice are shown in the accompanying FIGURE, basically comprises an electronic control unit ECU connected to the power-operated key-cylinder-less locks PDL and to the non-power-operated key-cylinder lock KDL, and a body computer BC connected to the electronic control unit ECU via an automotive on-board communication network NET, for example CAN, FlexRay or the like, to receive quantities indicative of the static or dynamic operating state of on-vehicle systems/components and responsively cause the power-operated key-cylinder-less locks PDL to open and close via the electronic control unit ECU, In particular, the electronic control unit ECU is programmed to:
- expediently allow the central opening and closing for the power-operated key-cylinder-less locks PDL by means of the remote control RC to be programmed, i.e. which of these, for example all of them, or only those of the front side doors, or only that of the driver's door, etc., are centrally locked and unlocked in response to the operation of a remote control RC integrated in a motor vehicle electronic ignition key EIK, which, as is known, also integrates a mechanical key MK to open the non-power-operated key-cylinder lock KDL of the bonnet BND;
- expediently allow central unlocking of the power-operated key-cylinder-less locks PDL by means of the mechanical key MK to be programmed, i.e. which of these are centrally unlocked in response to the manual operation of the non-power-operated key-cylinder lock KDL of the bonnet BND by means of the mechanical key MK, wherein the power-operated key-cylinder-less locks PDL may be either the same as, or different from, those that are centrally opened and closed in response to operation of the remote control RC integrated in the electronic ignition key EIK;
- centrally open and close the power-operated key-cylinder-less locks PDL in response to operation of the remote control RC integrated in the electronic ignition key EIK;
- sense manual operation of the non-power-operated key-cylinder lock KDL of the bonnet BND by means of the mechanical key MK; and
- upon determining a specific manual operation of the non-power-operated key-cylinder lock KDL of the bonnet BND by means of a mechanical key MK, responsively unlock those power-operated key-cylinder-less locks PDL for which the central unlocking by means of the mechanical key MK is programmed.

The above description allows the advantages that the present invention allows to achieve to be appreciated.

Firstly, the present invention enables lock cylinders for mechanical keys to be completely omitted from the motor vehicles side doors, thus representing a significant contribution to reducing costs ascribable to differentiation between right-hand drive motor vehicles and left-hand drive motor vehicles.

Secondly, opening the bonnet by means of a mechanical key enables the engine compartment to be accessed from the outside of the motor vehicle and the motor vehicle's electric battery (or battery pack) to be replaced or recharged in the event of a battery malfunction that compromise the operation of the central locking and unlocking system, or in the event of malfunction of the remote control integrated in the ignition key that compromise activation of the central locking and unlocking system.

Based on the above description, those skilled in the art can appreciate how modifications and variants can be made to present invention, without departing from the scope defined in the appended claims.

In particular, those skilled in the art can also appreciate how the present invention may find application even on those motor vehicles MV where the boot lid BTD is fitted with a key-cylinder lock KDL, which can be provided in alternative or in addition to the key-cylinder lock KDL of the bonnet BND and expediently is also power-operated so as to be centrally openable and closable.

Hence, in these motor vehicles, the power-operated key-cylinder-less locks PDL may (also) be unlock in response to a specific operation of the key-cylinder lock KDL of the boot lid BTD by means of the mechanical key MK. This operation may be alternative to that of the bonnet lock, should it be a key-cylinder-less lock and, hence, unlockable by means of an unlocking lever in the passenger compartment, or in addition to that of the bonnet lock, should it be a key-cylinder lock.

Moreover, it should be noted that there are also motor vehicles where, for safety or space reasons, the electrical battery (or battery pack) is arranged in the boot or beneath the boot loading floor. Furthermore, for the same or other reasons, in the future the electrical battery (or battery pack) in hybrid or electric motor vehicles might also be arranged in a dedicated battery compartment different from the engine compartment and the luggage compartment.

Based on the above description, those skilled in the art may appreciate how the present invention may also find application in these situations. In fact, by fitting the boot lid BTD, if not already provided with one, or the dedicated battery compartment with a key-cylinder lock, to cause them to be accessible from the outside of the motor vehicle via a mechanical key and allow the replacement or recharging of the electrical battery (or battery pack) in the above-described situations of malfunction thereof, the power-operated key-cylinder-less locks may then be unlocked in response to a specific operation of this key-cylinder lock by means of the mechanical key.

Furthermore, the present invention may also find application on those motor vehicles that when manufactured were not originally fitted with central unlocking and locking of the door and boot locks and this functionality was subsequently installed using special aftermarket central unlocking and locking kits.

In the end, the present invention may also find application on those motor vehicles where the power-operated locks of the doors and boot lid are centrally unlocked and locked using different technologies from that described, in particular through a wired or wireless lock-to-lock communication, which can be organized according to a master-slave hierarchy or to form an ad-hoc network.

What is claimed is:

1. A motor vehicle comprising:
    side doors;
    power-operated locks associated with one or more of the side doors;
    at least one of a hood or a trunk lid separate from the side doors; and
    an electronic control system to centrally lock and unlock one or more of the power-operated locks in response to a command imparted by means of a mechanical key or an electronic key;
    wherein power-operated key-cylinder-less locks are associated with all the side doors of the motor vehicle;
    further comprising a key-cylinder hood or trunk lid lock associated with at least one of the hood or trunk lid;
    wherein the electronic control system is further configured to sense operation of the key-cylinder lock associated with at least one of the hood or trunk lid by means of a mechanical key, and, upon determining a specific operation of the key-cylinder lock by means of the mechanical key, responsively unlock one or more of the power-operated key-cylinder-less locks associated with the side doors;
    wherein the at least one of the hood or the trunk lid is arranged to close a compartment in which an electric energy source of the motor vehicle is housed; and
    wherein the key-cylinder lock is a non-power-operated lock.

2. The motor vehicle according to claim 1, comprising only a single key-cylinder lock.

3. The motor vehicle according to claim 1, wherein the key-cylinder lock is associated with the hood, and a power-operated lock is associated with the trunk lid.

* * * * *